UNITED STATES PATENT OFFICE.

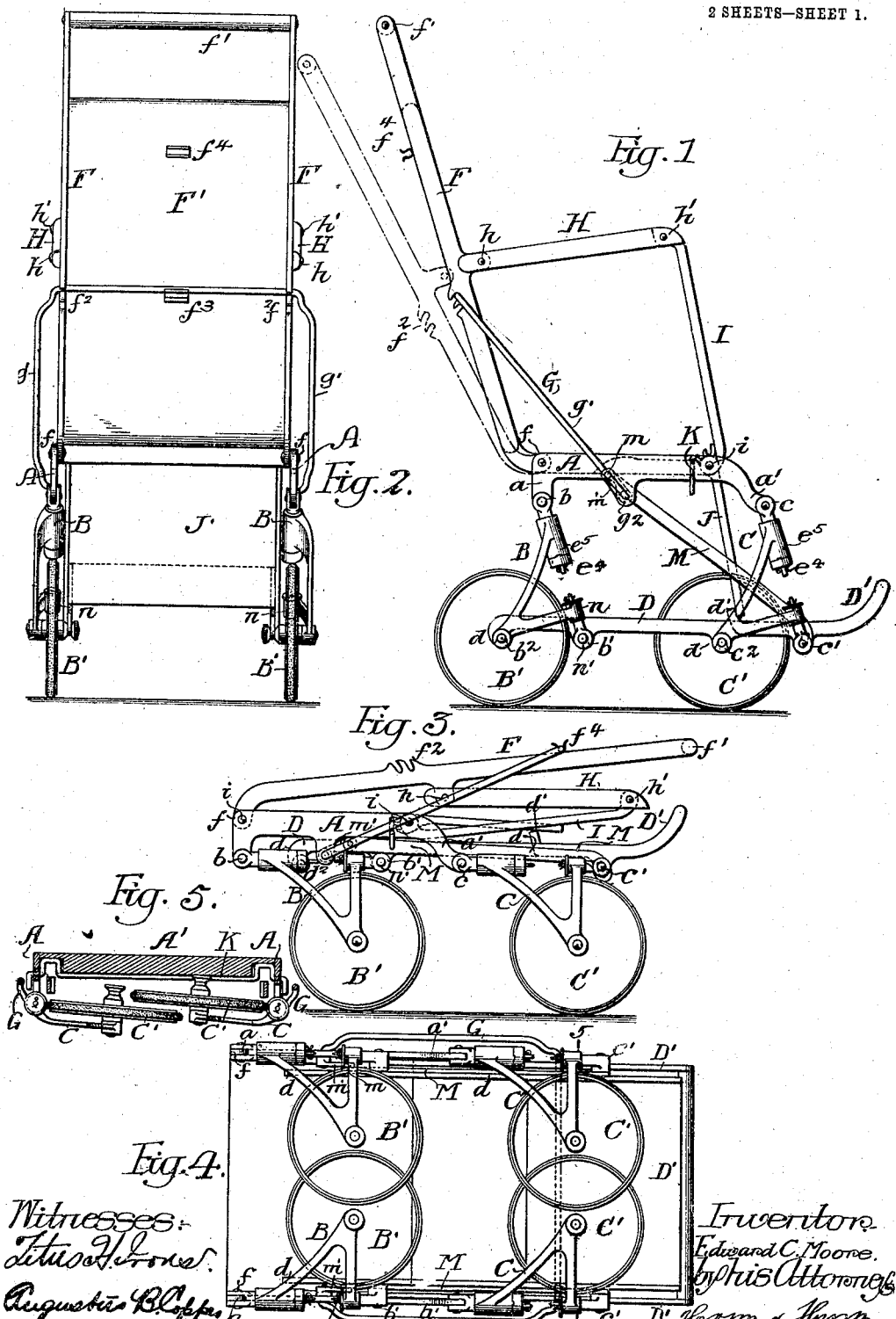

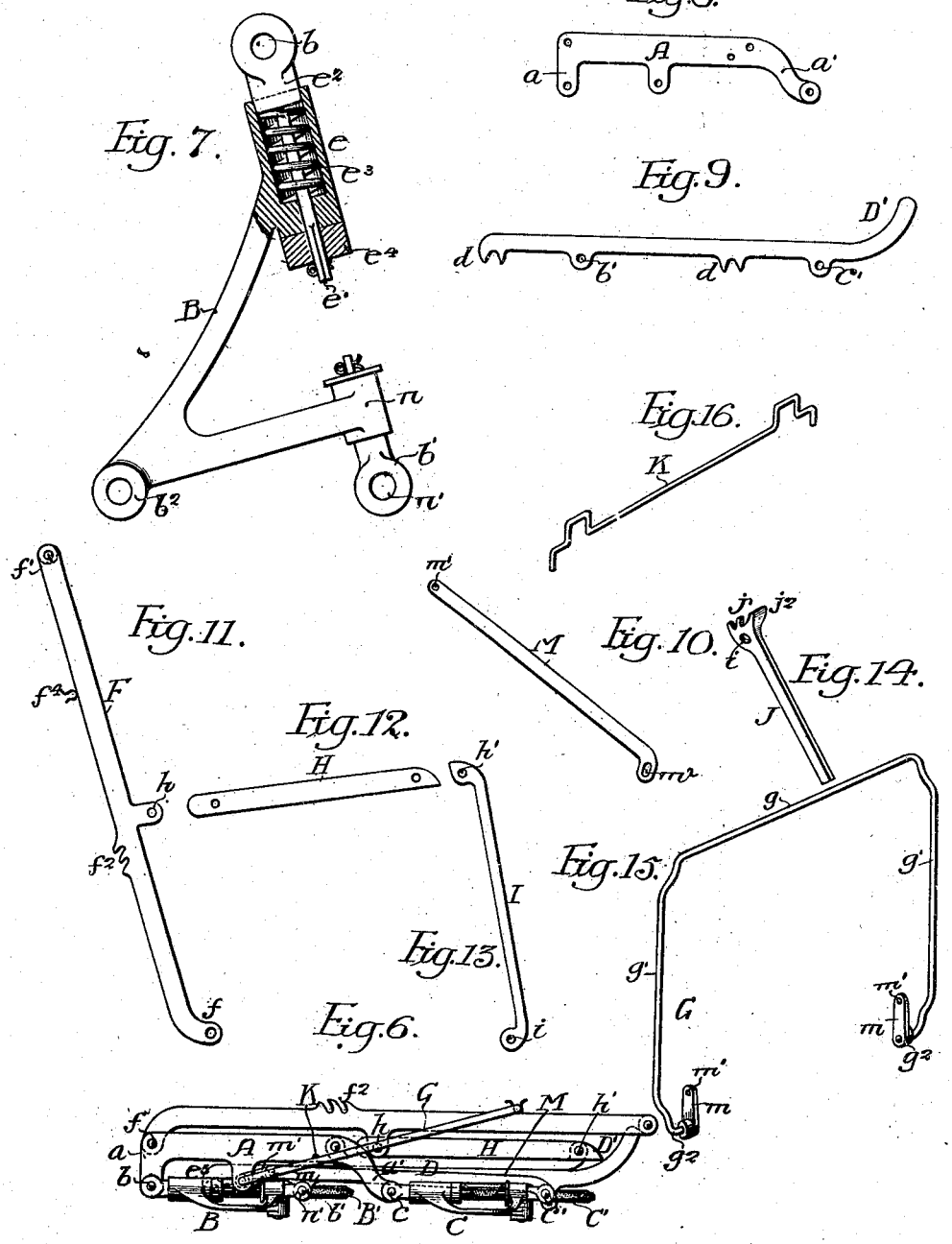

EDWARD C. MOORE, OF PHILADELPHIA, PENNSYLVANIA.

GO-CART.

No. 867,894.

Specification of Letters Patent.

Patented Oct. 8, 1907.

Application filed February 27, 1907. Serial No. 359,560.

*To all whom it may concern:*

Be it known that I, EDWARD C. MOORE, a citizen of the United States, residing in Philadelphia, Pennsylvania, have invented certain Improvements in Go-Carts, of which the following is a specification.

The object of my invention is to construct a go-cart so that it can be folded very compactly and which when extended will be rigid and substantial, and can be manufactured very cheaply.

In the accompanying drawings:—Figure 1, is a side view of my improved go-cart; Fig. 2, is a rear view; Fig. 3, is a side view showing the back and body portions partly folded; Fig. 4, is an inverted plan view showing the wheels folded against the body of the go-cart; Fig. 5, is a section on the line 5—5, Fig. 4; Fig. 6, is a side view showing the go-cart completely folded; Fig. 7, is a view of one of the wheel carriers partly in section, and Figs. 8 to 16 inclusive, are views in detail showing the parts detached.

A A are the two side frames of the body portion of the go-cart secured to the seat section A'. Each side frame has a downwardly projecting bearing $a$ at the rear to which is pivoted at $b$ the wheel carrier B, and a projecting bearing $a'$ at the front to which is pivoted at $c$ the front wheel carrier C. At each side of the go-cart below the side frame A, are longitudinal bars D to which the wheel carriers are pivoted at $b'$ and $c'$ respectively. The bars D have sockets $d$ in which rest the journals $b^2$ and $c^2$ respectively, on which are mounted the hubs of the wheels B' and C'.

The wheel carriers B may be rigidly connected to the side frames A, but I prefer to place springs in the carriers, as shown in detail in Fig. 7, so that the go-cart will ride more easily than if the construction was rigid.
In the present instance, each wheel carrier has a socket $e$ in which is mounted a rod $e'$ having a head $e^2$ and between the head on the rod and the base of the socket is a spring $e^3$. The end of the rod $e'$ is squared and fits a squared opening in a washer $e^4$, so that the washer will be stationary with the rod. The head $e^2$ of each rod $e'$ is pivoted to a side frame. Each socket is notched, as shown, and a projection $e^5$ on the washer is adapted to the notch, so that when the parts are in the position shown in Fig. 1, the notched washer will hold the wheel carriers in position until locked by the bars D. Therefore, it will be seen that there is a yielding connection between the wheel carriers and the side frames so that the go-cart will be as easy riding as the ordinary baby carriage.

It will be noticed that the socket $e$ is in line with a socket $n$ at the lower part of each wheel carrier; and adapted to this socket is a pin $n'$, which is pivoted in turn to the longitudinal bar D. By this arrangement the side frames A and the longitudinal bars D are so connected that one can fold longitudinally upon the other, and yet the wheel carriers, when the parts are folded, can turn so as to be folded under the body, as illustrated in Fig. 4.

Pivoted to the rear of the side frames A are two back frames F—F. The frames F are pivoted at $f$ to a side frame and are connected together at the top by the handle $f'$. F' is a back section mounted between the frames and secured thereto in any suitable manner. This back section is comparatively high and extends nearly to the handle $f'$ and acts to properly support the back of the child. The seat section and back section may be made of wood, canvas or any suitable material.

The back of the go-cart can be adjusted to either of two positions, as shown in Fig. 1, and is held in its adjusted position by a rod G, Fig. 15, which has a horizontal portion $g$ engaging hooks $f^2$ on the side frames F—F and has arms $g'$—$g'$, the ends of which are turned in to form pivots $g^2$, which are mounted in bearings in the side frames A. Carried by these pivots are cranks $m$.

By moving the back section it can be disengaged from the bar and the bar can be adjusted to engage either one of the two hooks on each side frame F, although any number of hooks may be provided to give more or less inclination to the back.

H H are the arm sections, formed as shown in Fig. 12, and each arm is pivoted to a back frame F at $h$—$h$, and to a connecting bar I at $h'$. This connecting bar is shown in Fig. 13, and each bar is pivoted to the frame A at $i$.

J—J are the side members of an apron J' and are pivoted at $i$ to the front end of the side frame A and extend down towards the longitudinal bars D. The bars J—J each rest against lugs $d'$ projecting from the bars D so as to limit the inward movement of the said bars J. Between the forward ends of the longitudinal bars D is a foot rest D' made of wood or metal, as desired, and this foot rest may extend rearwardly to any point desired. In the present instance, it simply extends to a point near the apron.

In order to adjust the apron so as to hold the child's legs at any angle desired, I form a series of teeth $j'$ at the pivot end of the bars and these teeth engage the cross bar K, which is bent, as shown clearly in Figs. 5 and 16, so as not to interfere with the workings of the several parts, but which can be shifted to readily engage the teeth $j'$. One of the teeth is extended laterally to form a stop lug $j^2$, which engages the connecting bar I which with the lug $d'$ holds the apron rigidly, but one or other of these lugs may be dispensed with in some instances.

Connecting rods M are pivoted at $m'$ to the cranks $m$ on the rod G and attached to the longitudinal bars D at $c'$ the rods M are slotted at $m^2$ to allow for the motion of the springs.

On the back section are clips $f^3$ and $f^4$, which are arranged to engage the bar G. The clip $f^3$ engages the bar when the parts are in the position shown in Figs. 1 and 2, and the clip $f^4$ engages the bar when the parts are in the position shown in Fig. 6.

If the go-cart is in the position shown in Fig. 1 and it is desired to fold the cart all that is necessary is to first detach the bar G from the back F, the back is then moved forward, folding the arm H and its connecting rod I to the position shown in Fig. 3, then the bar G is moved forward so as to rest upon the back F and as the cranks $m$ are attached rigidly to this bar G this will cause the bar M to draw the longitudinal bars D, D up under the seat section, as shown in Fig. 3. The wheel bearings are then in position to be folded under the seat section, as shown in Figs. 4 and 5, and when the parts are brought close together as in Fig. 6, the bar G will engage the clip $f^4$ and the handle $f'$ of the back section can be secured to the foot-board D', in any suitable manner, thus making a very compact and portable cart, which can be readily carried from place to place. The side members $g'$ of the bars G can be used as handles to properly carry the go-cart if desired.

When it is desired to open the go-cart for use, the parts can be quickly detached so as to bring them into the position illustrated in Fig. 1, and when in this position the go-cart will be perfectly rigid.

I claim:—

1. The combination in a folding go-cart, of the side frames, longitudinal bars, wheel carriers extending from the side frames to the longitudinal bars and pivoted to both the bars and the side frames, wheels on the carriers, the parts being arranged so that the frames can be brought close to the longitudinal bars and the wheels can fold under the frames, substantially as described.

2. The combination in a go-cart, of a side section having side frames, longitudinal bars below the side frames, wheel carriers pivoted to the bars and to the side frames, wheels mounted on the wheel carriers, the said carriers having double pivots so that the frames can be brought close to the longitudinal bars and the wheels can turn under the frames, substantially as described.

3. The combination of a seat section having side frames, longitudinal bars below the side frames, wheel carriers pivoted to the side frames and to the longitudinal bars, hooked projections on the longitudinal bars arranged to engage the wheel sections, with wheels mounted on the spindles, substantially as described.

4. The combination in a go-cart, of side frames, longitudinal bars, connecting wheel carriers, a back section pivoted to the side frames, and a bar also pivoted to the side frames at a point distant from the pivot of the back frame and engaging the back frame to hold it in its adjusted position, substantially as described.

5. The combination in a folding go-cart, of a seat section, longitudinal bars under the side frames, wheel carriers pivoted to the side frames and to the longitudinal bars, wheels mounted on the carriers, a back section pivoted to the rear of the side frames of the seat section, arms pivoted to the back frame, a connecting rod extending from the forward end of the arms to the forward end of side bars, with means for holding the back section in its adjusted position, substantially as described.

6. The combination in a folding go-cart, of the side frames, longitudinal bars below the side frames, wheel carriers pivoted to the side frames and to the longitudinal bars, wheels mounted on the carriers, an apron suspended from the side frames and resting against the lugs on the longitudinal bars, with means for holding the apron in its adjusted position, substantially as described.

7. The combination in a go-cart, of side frames, longitudinal bars, wheel carriers connecting the longitudinal bars to the side frames, a back section pivoted to the side frames, a rod retaining the back section in position, a crank on each pivot end of the rod, bars pivoted to the cranks and connected to the longitudinal bars so that when the back section is folded over the seat section and the bar folded over the back it will bring the longitudinal bars up close to the seat section, substantially as described.

8. The combination in a go-cart, of a seat section, longitudinal bars, wheel carriers connecting the bars to the seat section, an apron pivoted to the front of the seat section having a series of teeth at the pivot end, and a cross bar arranged to engage any one of the teeth to hold the apron in its adjusted position, substantially as described.

9. The combination of a go-cart, a seat section, longitudinal bars, wheel carriers connecting the seat section to the longitudinal bars, an apron pivoted to the front end of the seat section, a back section, arms connecting the back section with the front portion of the seat section, and lugs on the apron engaging the arm section, substantially as described.

10. The combination of a go-cart, a seat section, longitudinal bars, wheel carriers mounted between the bars and the seat section, each carrier having two sockets, pivot pins pivoted to the seat section and the longitudinal bars and mounted in the sockets, substantially as described.

11. The combination of a go-cart, side frames, longitudinal bars, wheel carriers connecting the longitudinal bars to the side frames, each wheel carrier having a socket, a spring mounted in the socket, and a pin mounted in the socket and resting against the spring, substantially as described.

In testimony whereof, I have signed my name to this specification, in the presence of two subscribing witnesses.

EDWARD C. MOORE.

Witnesses:
JOS. H. KLEIN,
WM. A. BARR.